J. STRAUB.
FLOWER BOX.
APPLICATION FILED OCT. 9, 1919.

1,375,333.

Patented Apr. 19, 1921.

Witnesses
William F. Piper
Paul A. Viesen

Inventor
J. Straub
By H. J. Sanders
Atty.

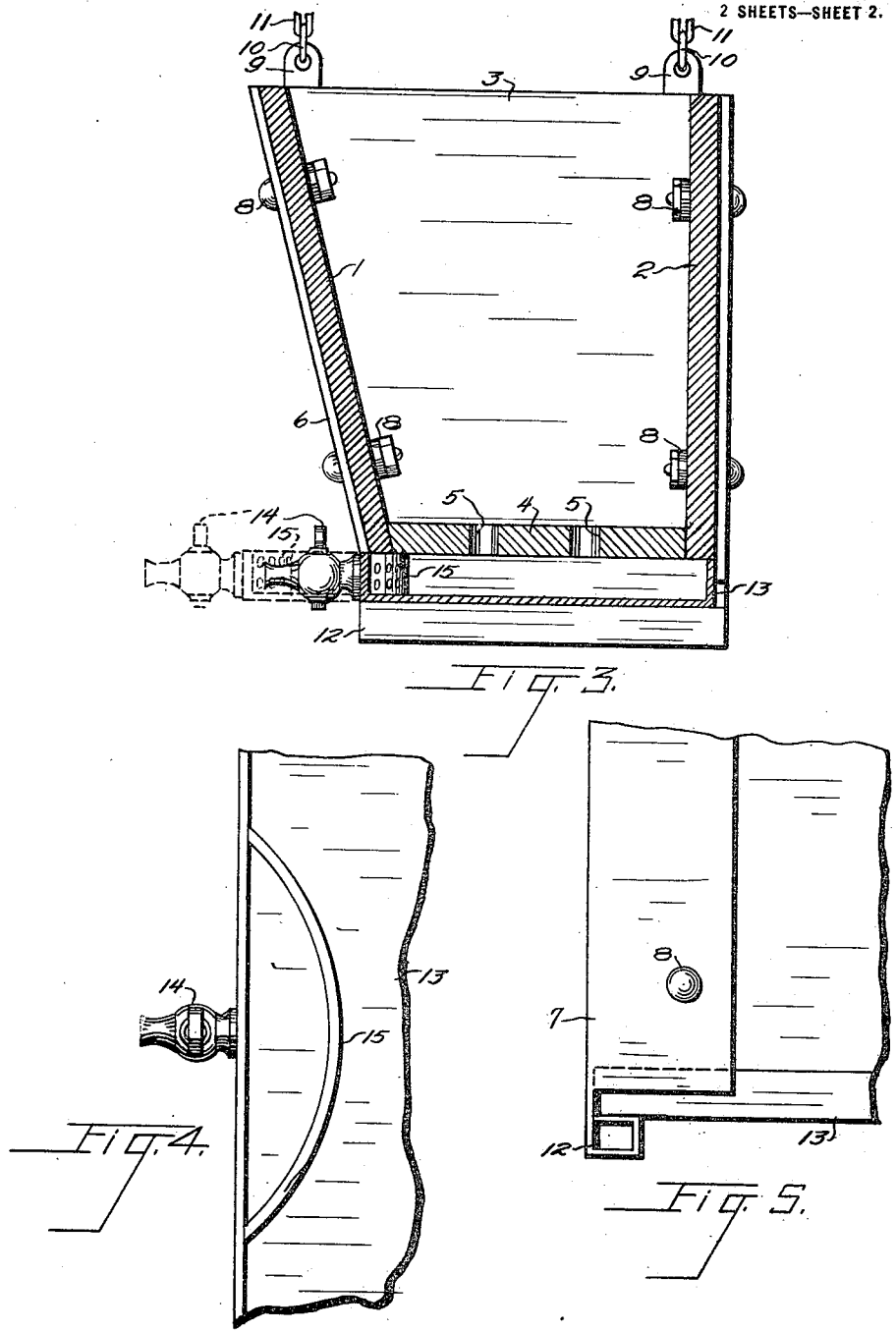

UNITED STATES PATENT OFFICE.

JOSEPH STRAUB, OF ROSSVILLE, GEORGIA.

FLOWER-BOX.

1,375,333. Specification of Letters Patent. Patented Apr. 19, 1921.

Application filed October 9, 1919. Serial No. 329,422.

*To all whom it may concern:*

Be it known that I, JOSEPH STRAUB, a citizen of Germany, residing at Rossville, in the county of Walker and State of Georgia, have invented certain new and useful Improvements in Flower-Boxes, of which the following is a specification.

This invention relates to improvements in flower boxes and among its objects are the provision of means to avoid the accumulation of liquid about the roots of potted plants and at the same time to keep the earth in which the plant grows in a moist condition; to facilitate the removal of surplus liquid while conserving such particles of earth as may pass from the box proper with such liquid; to provide means for aerating the earth in which the plant grows; and to provide a flower box that is substantial and durable in construction and ornamental in appearance. With the foregoing and other objects in view the invention consists in the combination and arrangement of parts to be hereinafter fully described, pointed out in the appended claim and illustrated in the accompanying drawings which form a part of this specification and in which—

Fig. 3 is a cross section taken on line 3—3 of Fig. 2.

Fig. 4 is a fragmentary view of the drain pan.

Fig. 5 is a fragmentary view of the rear end of the box.

Like reference characters denote corresponding parts throughout the several views.

Figure 1:
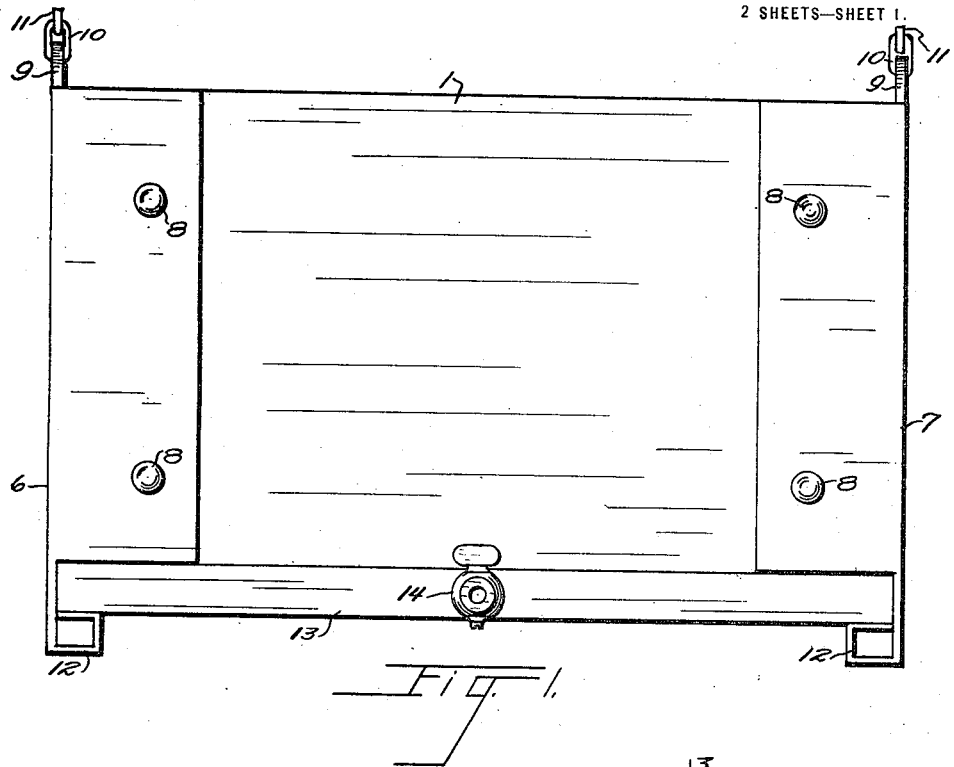
Figure 1 is a view of my improved flower box in front elevation.
Figure 2:
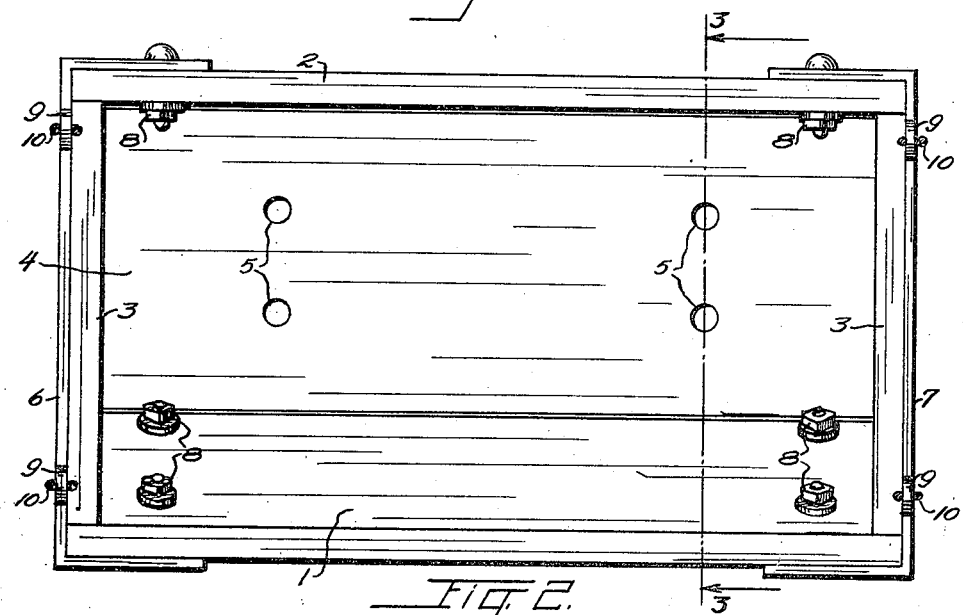
Fig. 2 is a plan view of the box.

The preferred embodiment of my invention comprises a substantially rectangular box of wood having the inclined front body-wall 1, perpendicular rear body-wall 2, end body-walls 3 and the bottom 4 formed with the perforations 5, the end walls resting upon the bottom 4 and the front and rear walls extending down flush with the lower face of the bottom. The end walls are secured to the front and rear walls by the metal cleats 6, 7, said cleats being retained in operative position by the bolts 8 which pass through the front and rear walls. The said cleats are formed with ears 9 which rise above the end walls 3 and are perforated to receive the hooks 10 carried by chains 11 which may support the box from a bracket or the like. The cleats 6, 7 extend below the lower end wall terminations and are bent to form feet 12 which extend longitudinally of the ends of the box and below the same and serve as supports for the pan 13 which is disposed beneath the box bottom 4. The cleats at the front end of the box stop substantially flush with the lower end of the front wall to afford clearance for the pan 13 while said cleats at the back of the box depend slightly below the lower termination of the rear wall to form a stop for the pan 13, as shown in Fig. 5, to prevent it from passing partly out of the rear of the box.

The pan 13 is provided with a discharge faucet 14 which will drain the pan and which faucet is adapted to receive one end of a rubber hose (not shown) so that the discharge from the pan may be conducted to a receptacle. The pan is provided, further, with a curved perforated shield 15 which is disposed adjacent the faucet and is adapted to strain the liquid contents of the pan before such contents pass out through the faucet. The pan in position beneath the bottom 4 receives the surplus liquid passing through the earth in the box and also such particles of earth as may pass through the box perforations 5 or through the space between the bottom 4 and the front or rear walls. Such particles of earth as may collect in the pan may, by partially or completely removing the pan from the box, be restored to the box proper.

What is claimed is:—

In a flower box, a body portion including body walls and a perforated bottom, cleats connecting said body walls and depending below said end walls to form feet, ears for said cleats, a pan removably disposed beneath said bottom upon said cleat terminations, a discharge faucet for said pan, and a perforated shield for said pan adjacent said faucet.

In testimony that I claim the foregoing as my own I have hereto affixed my signature in the presence of two subscribing witnesses.

JOSEPH STRAUB.

Witnesses:
J. W. H. LUTTRELL,
C. D. GREEN.